Oct. 16, 1928.

H. P. THOMPSON 1,688,250

PROTECTING GUARD FOR TIRES

Filed Dec. 31, 1926

Harry P. Thompson
INVENTOR

BY Victor J. Evans
ATTORNEY

Walter Chism
WITNESS:

Patented Oct. 16, 1928.

1,688,250

UNITED STATES PATENT OFFICE.

HARRY P. THOMPSON, OF PHILADELPHIA, PENNSYLVANIA.

PROTECTING GUARD FOR TIRES.

Application filed December 31, 1926. Serial No. 158,356.

Very often particles of glass, tacks, or other sharp objects adhere or stick into and bury in the treads of automobile tires. These objects if continually rolled upon will penetrate the tread wall of the tire and cut or perforate the inner tube, causing a flat tire, necessitating time and expense to remove the tire, and repair the inner tube. Constantly receiving punctures in this way soon wears out the tread of the tire, and necessitating the purchase of new ones.

It is the purpose of the present invention to avoid punctures, and thereby eliminate the loss of time, labor and expense in the repair of tires, and to accomplish this result it is the aim to provide an improved protecting guard suspended resiliently from the under surface of the fender, the guard shoe proper being yieldably mounted on the resilient suspending member so as to be positioned at the rear of the tire, the guard being constructed to conform to the contour of the tire, so that any sharp object, such as glass, tacks, or other article that may adhere or stick to the tire may be struck off or deflected from the surface of the tread, thereby preventing such article or object from being constantly rolled upon during the revolutions of the wheel.

Similar devices have been produced, but there are none that embody the present particular features of construction, namely, one wherein the shoe is resiliently suspended, and the shoe proper having a pivotal yielding action, so that any sharp article or object that may adhere to the tread of the tire may be deflected or knocked from the surface of the tread.

Another purpose is to provide the arcuate surface of the shoe with curved ribs, which are angularly disposed, in order that any sharp object or article that may adhere to the surface of the tire may be cammed or deflected from the surface of the tread.

It is to be understood that the particulars herein given are in no way limitative and that while still keeping within the scope of the invention, any desired modification of detail and desired proportions may be made in the device according to the circumstances.

The invention comprises further features and combinations of parts to be hereinafter set forth, shown in the drawings and claimed.

In the drawings

Figure 1:
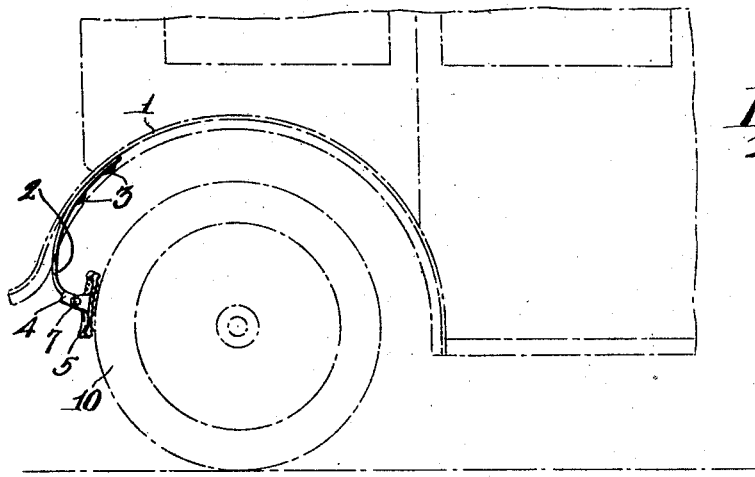
Figure 1 is a view in side elevation of a portion of an automobile, showing the improved protecting guard as applied to the fender and resiliently supported at the rear of the tread.
Figure 2:
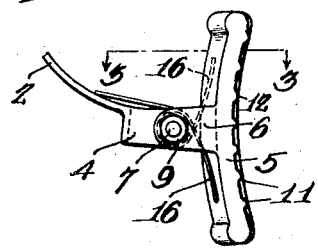
Figure 2 is an enlarged view in edge elevation of the protecting guard.

Referring to the drawings—1 identifies one of the fenders of an automobile and 2 is a resilient hanger which is fastened in any suitable manner as at 3 to the fender.

Figure 3:
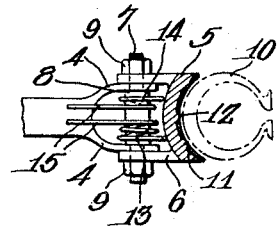
Figure 3 is a sectional view on line 3—3 of Figure 2.
Figure 4:
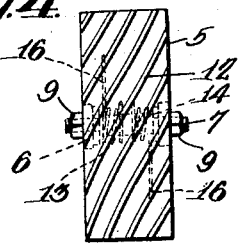
Figure 4 is a view in elevation of the inner face of the protecting guard or shoe.

The lower end of this hanger terminates in spaced arms 4, and 5 identifies the protecting shoe or guard, which is provided with rearwardly projecting spaced arms 6. The arms are spaced wider than the arms 4, but just sufficiently in order to straddle the remote faces of the arms 4, as shown clearly in Figure 3.

A suitable screw or pin 7 passes through the arms 4 and 6 and also through a sleeve 8 which is of a length to engage between the arms 4 to prevent the arms 4 from displacement toward each other. Suitable nuts 9 are threaded to the screw or pin 7, to retain the arms of the shoe or guard as pivotally mounted upon the pin.

The guard or shoe is of arcuate form that is concentric to the center of the wheel, and is also curved in cross section, conforming concentrically to the cross sectional area of the tire 10. This arcuate surface 11 of the guard or shoe is provided with a plurality of inclined ribs 12, which are partially of compound curvature. These ribs are so disposed as to extend angularly across the tread surface of the tire, and act to cam any sharp objects or articles such as broken glass, tacks, or the like laterally outwardly from the line of travel of the wheel of the automobile.

Coiled about the sleeve 8 are springs 13 and 14. Corresponding ends 15 of the springs bear against portions of the resilient hanger 2, while the other corresponding ends 16 of the springs bear against the outer surface of the shoe or protecting guard, thereby holding the guard yieldably in position concentrically in conformity to the tread surface of the tire, whereby the ribs 12 may be disposed in relatively close position to the tread surface of the tire, to insure deflecting any sharp object or article to one side of the wheel and hence preventing injury to the tire and final puncture to the inner tube. Owing to the yieldability of the guard, the guard may accommodate itself concentrically to the tread surface, and in such a manner as not to hinder the wheel in its revolutions.

The invention having been set forth, what is claimed is:—

A protecting tire guard, comprising a resilient hanger for suspension from a fender of an automobile, the lower end of the hanger curving downwardly and slightly forwardly toward the rear portion of the rear wheel of the automobile, the extremity of the hanger terminating in forks, a guard shoe curved in cross section to conform to the transverse curvature of the tire on the wheel and curved concentric with the wheel, the rear face of the guard having rearwardly projecting spaced arms straddling the arms of the fork, a pivot passing through the arms of the fork of the rearwardly projecting arms of the guard shoe, two sets of resilient means consisting of coiled springs mounted upon the pivot, said coil springs having terminal extensions cooperating with the hanger and the rear face of the guard shoe, to retain the shoe in substantial position concentric to the tire, the engaging face of the shoe having angularly disposed ribs for deflecting foreign matter from the tread of the tire.

In testimony whereof I affix my signature.

HARRY P. THOMPSON.